UNITED STATES PATENT OFFICE.

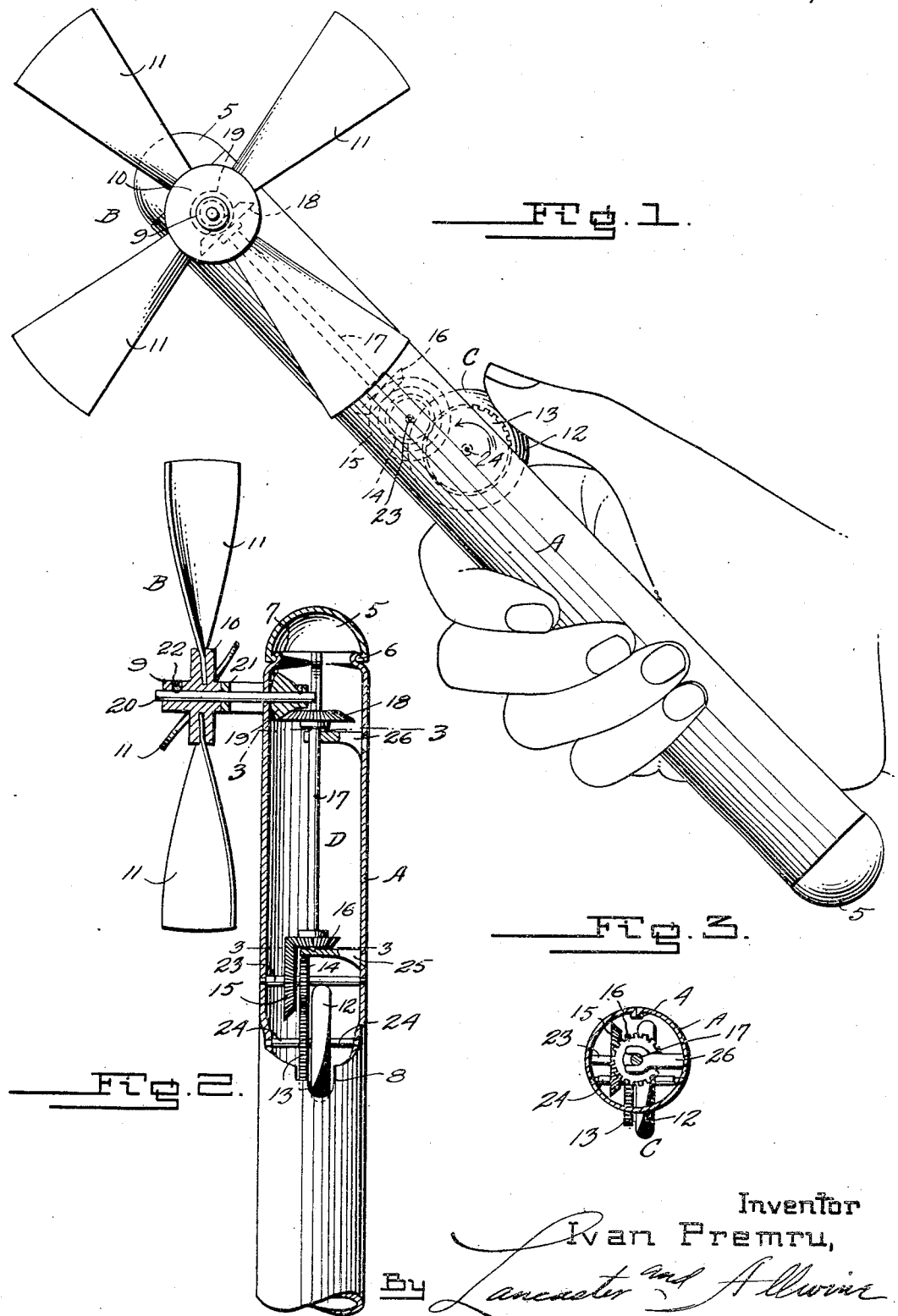

IVAN PREMRU, OF SOUTH NORWALK, CONNECTICUT.

MECHANICAL HAND-FAN.

1,251,571.  Specification of Letters Patent.  Patented Jan. 1, 1918.

Application filed January 5, 1916. Serial No. 70,371.

*To all whom it may concern:*

Be it known that I, IVAN PREMRU, a subject of the Emperor Francis Joseph of Austria, residing at South Norwalk, in the county of Fairfield and State of Connecticut, have invented a new and useful Mechanical Hand-Fan, of which the following is a specification.

My present invention relates to a mechanical fan adapted to be held in the hand, and embodying an air agitator, rotated through speed increasing transmission manually operable by the thumb of the hand holding the device.

The principal objects of my invention are to provide a mechanical fan in which the major portion of the mechanism is concealed or incased so as not to become clogged with dust or tampered with; and, to provide for the disposition of parts in such a manner that assemblage is facilitated.

A further object of the invention is to so dispose certain arbors for gear wheels and a thumb wheel that the pressure upon the latter is distributed to the bearings of a plurality of such arbors thus adding longevity to the device.

Other objects of the invention will appear in the following detailed description, taken in connection with the accompanying drawing forming a part of this specification, and in which drawing:

Figure 1 is perspective view of a fan constructed according to my invention, the same being shown as held in the hand of the operator.

Fig. 2 is a view partly in longitudinal section and partly in elevation, disclosing the interior mechanism of the fan.

Fig. 3 is a sectional view on the line 3—3 of Fig. 2.

In the drawing, where similar characters refer to similar parts, A designates a tubular body; B an air agitator; C a thumb wheel; and, D positive speed increasing motion transmitting mechanism operatively connected with said thumb wheel and air agitator whereby movement of the former may be imparted to the latter.

Referring first to the tubular body A, it is preferably circular in cross section and may be formed of sheet metal joined as at 4 by welding. The upper and lower ends may be closed by caps 5, having a flange 6 embracing the reduced portion 7 of the body A. For a purpose to be subsequently set forth the body A is provided with a longitudinally extending slot 8 adjacent the central portion of the body.

The air agitator B may be of any suitable type, and as shown in the drawing comprises a hub 9, fly wheel extension 10 and a plurality of blades 11 which may be embedded in the extension 10.

As to the thumb wheel C it is preferably provided with a rim 12 of resilient material, such as rubber to facilitate frictional engagement of the operator's thumb therewith and to avoid callus if the device is used continuously for a considerable length of time. This thumb wheel is so disposed as to have its major portion within the body A but to extend laterally through slot 8, as clearly shown in Fig. 1 of the drawing.

Referring now generally to the speed increasing transmission, it preferably comprises a gear wheel 13 movable with thumb wheel C; a gear wheel 14 co-meshing with wheel 13; a beveled gear 15 movable with wheel 14; a co-meshing beveled gear 16; a spindle 17 extending longitudinally of body A and rigid with beveled gear 16; a beveled gear 18 rigid with spindle 17 adjacent its upper end; and a beveled gear 19 co-meshing with gear 18 and rigid with a shaft 20 extending transversally through the body A and supported exteriorly of the body as by bearing 21, all of which form a part of positive mechanism between the wheel C and the agitator B. The shaft 20 has the air agitator B secured rigid therewith, as by set screw 22 carried by hub 9. The gears 14 and 15 are supported by an arbor 23 having its bearings at the opposite wall portions of the body A in a plane coincident with the longitudinal axis of said body, while the gear 13 and thumb wheel C are supported by a second arbor, having its bearings in the wall of said body, but offset with respect to the plane hereinbefore referred to, and relatively nearer to the slot 8, so that as pressure is brought upon the thumb wheel C it is transmitted to the bearings of arbor 24 and also to the bearings of arbor 23, through the co-meshing gears 13 and 14.

The spindle 17 is supported, at its lower end, by a step bearing 25, and adjacent its upper end by a forked bearing 26 having its open portion facing the wall portion through which shaft 20 extends, and for the purpose of facilitating assemblage.

When assembling the device, the arbors 23 and 24 are positioned before the body A is welded longitudinally. Before placing the uppermost element 5, the spindle 17 with the beveled gears is dropped in place to be supported by the bearings 25 and 26 and it is to be observed that, as the shaft 20 is positioned, and the beveled gear 19 made rigid therewith, this gear holds the spindle 17 against either lateral or longitudinal movement. The fly wheel like extension 10 facilitates rotation of the elements making up transmission D and enables the operator to work up speed by imparting a pushing action to the thumb wheel C, rotating it in the direction indicated by the arrow in Fig. 1.

It is to be observed that the air agitator B is at all times under the control of the operator since mechanism D is positive in action. Fans of this character are often used by barbers for the purpose of drying the face after shaving, and the rotatable body B can be quickly stopped by pressing the thumb on wheel C retarding its movement in order to lay down the device without danger of the blades 11 becoming injured. The device may also be used to create a suction by imparting movement to the wheel C in a direction counter to that indicated by arrow in Fig. 1.

Changes may be made in detail without departing from the spirit of my invention; but,

I claim:

A mechanical fan comprising in combination, a tubular body, a step bearing within said body, a spindle extending longitudinally of said body and resting upon said step bearing, a forked bearing extending laterally from the inner wall of said body, receiving the upper end of said spindle, a beveled gear rigid with and disposed adjacent the upper end of said spindle, a shaft extending transversally through the wall of said body opposite to the open portion of said forked bearing, a second beveled gear co-meshing with and resting upon said first beveled gear, and rigid with said shaft, for holding said spindle upon said step bearing and against said forked bearing, an air agitator rigid with said shaft exteriorly of said body, and means for imparting circumferential movement to said spindle from the exterior of said body.

IVAN PREMRU.

Copies of this patent may be obtained for five cents each, by addressing the "Commissioner of Patents. Washington, D. C."